US 6,650,392 B2

(12) United States Patent
Iwanaga et al.

(10) Patent No.: US 6,650,392 B2
(45) Date of Patent: Nov. 18, 2003

(54) CELL STRUCTURE OF LIQUID CRYSTAL DEVICE

(75) Inventors: Hiroki Iwanaga, Kanagawa-ken (JP); Masao Tanaka, Kanagawa-ken (JP); Yutaka Nakai, Kanagawa-ken (JP); Katsuyuki Naito, Tokyo (JP); Seizaburo Shimizu, Kanagawa-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 310 days.

(21) Appl. No.: 09/793,418

(22) Filed: Feb. 27, 2001

(65) Prior Publication Data
US 2001/0030730 A1 Oct. 18, 2001

(30) Foreign Application Priority Data

Mar. 15, 2000 (JP) .......................... 2000-072549
Sep. 13, 2000 (JP) .......................... 2000-277823

(51) Int. Cl.$^7$ ........................................... G02F 1/1339
(52) U.S. Cl. ..................................................... 349/153
(58) Field of Search .......................... 349/83, 122, 138, 349/153, 154

(56) References Cited

U.S. PATENT DOCUMENTS

| 4,536,060 A | * | 8/1985 | Takamatsu et al. | ......... 349/153 |
| 5,037,185 A | * | 8/1991 | Grupp | ......... 349/195 |
| 5,076,667 A | * | 12/1991 | Stewart et al. | ......... 349/139 |
| 5,517,344 A | * | 5/1996 | Hu et al. | ......... 349/153 |
| 5,687,465 A | * | 11/1997 | Hinata et al. | ......... 29/402.01 |

FOREIGN PATENT DOCUMENTS

| JP | 05-297384 | 11/1993 |
| JP | 10-123537 | 5/1998 |

* cited by examiner

Primary Examiner—Kenneth Parker
(74) Attorney, Agent, or Firm—Oblon, Spivak, McClelland, Maier & Neustadt, P.C.

(57) ABSTRACT

A liquid crystal display comprises a substrate, a liquid crystal layer disposed on the substrate; and a sealing part surrounding the liquid crystal layer and disposed on the substrate, wherein the sealing part comprises a hygroscopic solution. The liquid crystal display device of the invention provides for weight savings in cell manufacture and permits miniaturization of liquid crystal display devices, while maintaining excellent display quality.

18 Claims, 15 Drawing Sheets

CELL STRUCTURE OF LIQUID CRYSTAL DEVICE

CROSS-REFERENCE TO RELATED APPLICATIONS

This application is based upon and claims the benefit of priority from the prior Japanese Patent Applications No. 2000-72549, filed on Mar. 15, 2000 and No. 2000-277823 filed on Sep. 13, 2000; the entire contents of which are incorporated herein by reference.

BACKGROUND OF THE INVENTION

1. Field of the Invention

The present invention relates to a liquid crystal display device, and particularly it relates to the damp-proof structure of a liquid crystal display device.

2. Description of the Background

In recent years, a liquid crystal display device has been widely used as a display device in portable information equipment because of its characteristics including lightweight, its small thickness and low power consumption. In order to obtain a bright and brilliant image, it is now becoming mainstream practice to employ an active matrix type liquid crystal display device having thin film transistors (TFT) arranged as a switching device at respective pixels.

Among various liquid crystal display devices, those that are used indoors can be sufficiently isolated from moisture by an ordinary sealing member covering the outer periphery of a liquid crystal cell. Thus, it is difficult to cause decreases in voltage retention, which bring about obstruction when driving the TFT, in such devices. However, with respect to those that are mainly used outdoors, such as in portable information equipment, the environment surrounding a given liquid crystal display device is far severer than those used indoors.

In recent years, liquid crystal display devices have been used in marine applications such as in small boats. Such devices are particularly attractive because of they can be installed in diverse locations particularly in small boats used in marine leisure activities. For example, such devices are often used as display devices in fishfinders, radars and GPS devices. Because the display devices are subjected to severe environments, isolation of the structures of the devices from moisture sometimes is not sufficient using conventional sealing members, thereby resulting in deterioration of the device properties, such as decreases in resistance of the liquid crystal. This decrease in resistance results in substantial deterioration of the display performance, thereby decreasing the service lives of the devices. Even in the case of liquid crystal display devices used indoors, penetration of moisture into the interior of the liquid crystal display devices occurs after use for long periods of time.

Normally, a waterproof frame comprising a polymer member is attached on the outside of the liquid crystal display portion in order to solve the problem. However, the conventional waterproof frame has a large outer dimension and a heavy weight in order to increase the waterproofing performance. Another problem is that since the proportion of the display region with respect to the area of the outer frame is decreased, it is difficult to see the display device. Furthermore, while the conventional waterproofing frame can effectively prevent liquid water from penetrating display devices, it is not very effective in preventing penetration of water vapor molecules acting. That is, water vapor molecules penetrate through the network structure of the polymer even in small amounts thereby invading the display region. Therefore, upon exposure to an environment of high humidity, there is the possibility of deterioration in display quality because of a decrease in voltage retention.

This problem becomes significant in liquid crystal display devices of the guest-host type (GH type liquid crystal) described below. GH type liquid crystals have attracted attention because of their wide viewing angle. The GH type liquid crystal is formed by dissolving a dye having a large dichroic ratio in a liquid crystal. Particularly, in recent years, because of the increased demand for color display devices, the development of GH type color liquid crystal display devices is earnestly conducted. However, the reliability of the GH type liquid crystal is very hard to maintain, because the GH type liquid crystal suffers reduction in voltage retention because of several factors, such as the decomposition of dye molecules and contamination by ionic impurities. Furthermore, a polar compound, such as a dye, can extract inorganic ions from glass substrates. When water intervenes, the mobility of the extracted inorganic ion notably increases, which results in a rapid loss of electrical resistance thereby greatly reducing the voltage retention. Accordingly, the extent of reduction in voltage retention of the GH type liquid crystal caused by the invasion of water becomes far larger than for other liquid crystals. There is no solution to the problem, and thus it is the present situation that the practical application of a liquid crystal display device of the TFT driven using the GH liquid crystal is delayed.

SUMMARY OF THE INVENTION

Accordingly, one object of the present invention is to provide a liquid crystal display device with savings in weight and which permits miniaturization and to provide a liquid crystal display device which is effective in preventing deterioration of display quality because of moisture penetration.

Another object is to provide a liquid crystal display device having high reliability that can maintain excellent display quality.

Briefly, this object and other objects of the present invention as hereinafter will become more readily apparent can be attained by a liquid crystal display comprising:

a substrate;

a liquid crystal layer disposed on the substrate; and a sealing part surrounding the liquid crystal layer and disposed on the substrate, wherein the sealing part comprises a hygroscopic solution.

The term "display quality" herein means that an image display of high speed and brilliant color display can be conducted. A gauge of reliability is that little deterioration takes place.

The sealing part of the liquid crystal display of the present invention comprises a hygroscopic solution.

The sealing part may comprise an inner sealing part and an outer sealing part, with the hygroscopic solution disposed between the inner sealing part and the outer sealing part.

The liquid crystal display may further comprise a first inlet of the liquid crystal layer; and second inlets of the hygroscopic solution next to the first inlet.

The liquid crystal display may further comprise a first inlet of the liquid crystal layer; and second inlets of the hygroscopic solution on the opposite side of the substrate disposed at the first inlet. The hygroscopic solution may be the same liquid crystal as the liquid crystal layer.

The hygroscopic solution may comprise suspended hygroscopic compound particles. The liquid crystal display may further comprise a counter substrate disposed on the liquid crystal layer.

The sealing part may comprise polymer particles which involve the hygroscopic solution. The hygroscopic solution may be a guest-host type liquid crystal.

The sealing part may further comprise a polymer seal wall.

The polymer particles may be in the form of fine particles and the polymer particles may have an average diameter of 3 micrometers.

The hygroscopic solution may comprise at least one material selected from the group consisting of $P_2O_5$, $Mg(ClO_4)_2$, $SiO_2$, $CaSO_4$, $CaCl_2$, and $CuSO_4$.

The liquid crystal layer may consist of a guest-host type liquid crystal.

The hygroscopic solution may comprise a silicone oil and a guest-host type liquid crystal. The hygroscopic solution can take in vapor and change the vapor to liquid.

The present invention provides a liquid crystal display comprising: a pair of substrates; a liquid crystal layer disposed between the substrates; a sealing part surrounding the liquid crystal layer and disposed on the substrates; and a protective layer covering the pair of substrates and the sealing part.

The sealing part may comprise an inner sealing part; an outer sealing part, with the hygroscopic solution disposed between the inner sealing part and the outer sealing part.

The sealing part may comprise polymer particles which involve the hygroscopic solution.

When the liquid crystal cell as described above is exposed to an environment of high humidity, the second sealing part is exposed to water vapor molecules, but even though the water vapor molecules penetrate through the second sealing part, the small amount of water vapor molecules are caught by the filler in the second region, and thus they do not penetrate the first sealing part, thereby preventing invasion of water into the liquid crystal cell. The filler is a hygroscopic solution.

When the liquid crystal cell is exposed to an environment of high humidity, the halogenated ethylene resin covering the entire outside of the cell is exposed to water vapor molecules, but because the halogenated ethylene resin has excellent damp-proof properties, the water molecules do not penetrate the cell thereby preventing invasion of water into the liquid crystal cell.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Embodiments of the liquid crystal display device relating to the invention will be described with reference to the drawings.

In the embodiments of the liquid crystal display devices described, the description and diagrammatic representation of such structures that are general to liquid crystal devices, for example, electrodes and the wiring formed on a substrate and other parts. Materials and the like referred to in the embodiments are only examples.

A first embodiment is described with reference to FIGS. 1 and 2.

Figure 1:
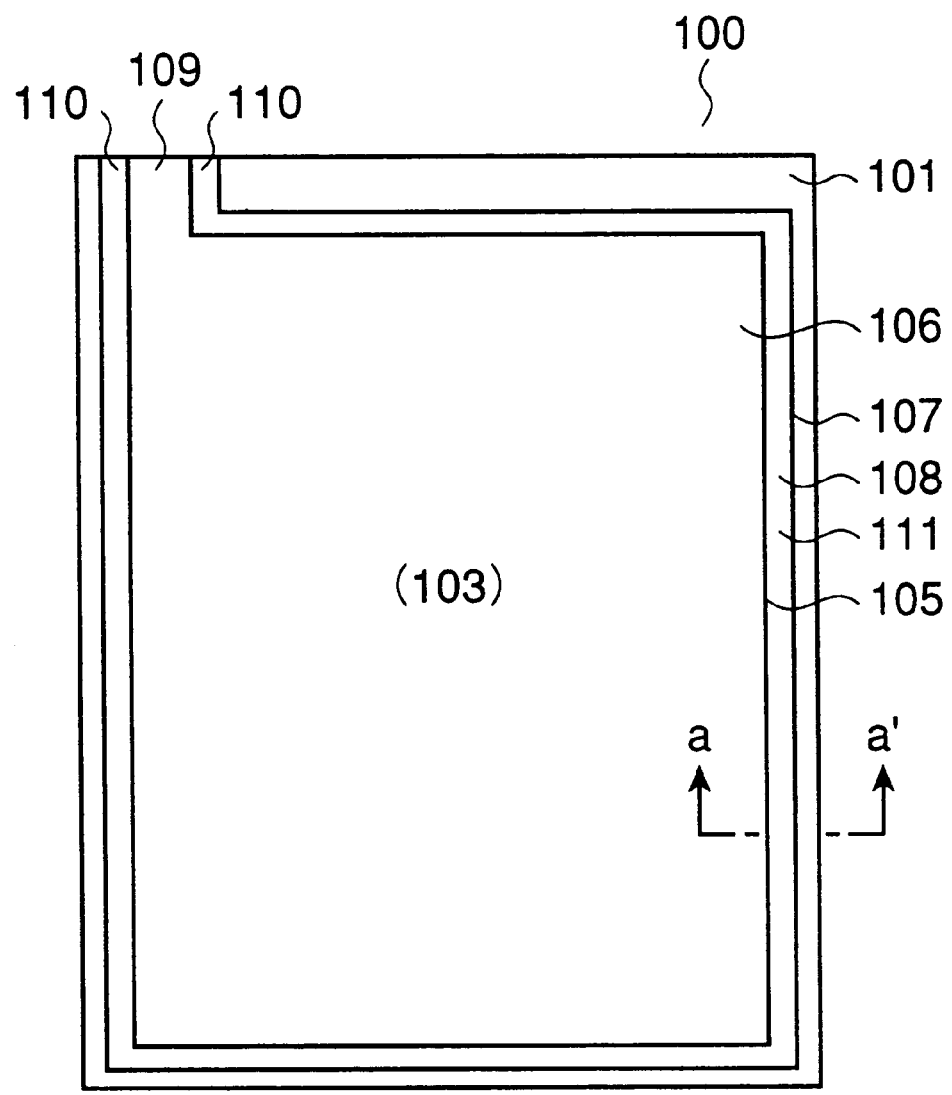
FIG. 1 is a schematic plan view of a liquid crystal cell of a first embodiment of the invention.

FIG. 1 is a schematic structural view of a liquid crystal cell 100 and a schematic plan view showing the structure of a sealing part. FIG. 2 is a schematic cross-sectional view on line a–a' in FIG. 1.

The liquid crystal cell referred to herein is a structure which is filled with a liquid crystal. In general, it is a structure comprising a pair of substrates, the ends of which are sealed. However, it may have any structure enveloping a liquid crystal, and a single substrate structure using a film capable of retaining a liquid crystal layer instead of one substrate may be employed.

The liquid crystal cell 100 comprises an array substrate 101 and a counter substrate 102 arranged to face each other in a prescribed distance, and a liquid crystal layer 103 is retained therebetween. On the array substrate 101 and the counter substrate 102, typical electrodes and wiring (not shown in the figure) are formed, and an orientation film 104 is formed as a front layer in contact with the liquid crystal layer 103.

The liquid crystal cell 100 of this embodiment has a double seal structure comprising an inner seal part 105 and an outer seal part 107.

That is, the inner seal part 105 and the outer seal part 107 are formed in rectangular shapes between the array substrate 101 and the counter substrate 102. Herein, although the expression "rectangular shape" is used, the shape of the structure also includes those shapes where the corners are rounded. The interior of the double seal part of the structure is filled with a liquid crystal to form a display region 106 where image are displayed. The display region, for example, a GH type liquid crystal layer 103, is filled with liquid crystal material. Examples of the liquid crystal material include LIXON 5052 produced by Chisso Corp. as a base, in which a yellow dye D80 produced by BDH Chemicals Corp., a magenta dye G-176 produced by Nippon Kanko Shikiso Research Institute Co., Ltd. and a cyan dye SI-497 produced by Mitsui Chemical Co., Ltd. are dissolved and the liquid crystal material is adjusted for its blackness.

A filler region 108 divided into a galleria form is provided between the inner seal part 105 and the outer seal part 107. The filler is a hygroscopic solution. The filler region 108 is a region which is filled with a filler 109 described later. The filler region 108 functions as a trap for water molecules invading from outside the cell.

In the display region 106 and filler region 108, a display region inlet 109 and a filler region inlet 110 are provided at positions close to each other.

The inner seal part 105 and the outer seal part 107 are formed on one of the array substrate 101 and the counter substrate 102, for example, by a screen printing method. It is desired that the resin material which is used as the seal parts have excellent dampproofness, and for this purpose desirable resin materials include halogenated ethylene resins, such as a trifluorinated chlorinated ethylene resin, a trifluorinated ethylene resin, difluorinated dichlorinated ethylene resin, monofluorinated trichlorinated ethylene resin and a tetrachlorinated ethylene resin. Moreover, the distance between the substrates 101 and 102 is about 10 $\mu$m. ML-3701P produced by Nippon Kayaku Co., Ltd. may be used as the inner seal part 105 and the outer seal part 107.

A filler 111 placed in filler region 108 is a medium which has the function of catching water molecules. A suitable filler 111, is the same GH type liquid crystal as the liquid crystal layer 103. At this time, the inlets 109 and 110 are formed at positions close to each other in the liquid crystal cell 100, and thus the GH liquid crystal can be placed in both the liquid crystal layer 103 and the filler region 108 in the same filling step. In this case, the number of operational steps can be reduced in comparison to the case where different materials are placed in the liquid crystal layer 103 and the filler region 108, respectively. Further, since the same filling material is used, the production costs can be reduced.

Finally, the GH type liquid crystal fills display region 106 and filler region 108, and the display region inlet 109 and the filler region inlet 110 are sealed, whereby a GH type liquid crystal cell is obtained.

According to liquid crystal cell 100, when the liquid crystal cell is exposed to an environment of high humidity, the outer seal part 107 is exposed to water molecules in vapor form. As pointed out above, this penetration is normally a problem of liquid crystal cells, in that small amounts of water molecules can penetrate the outer seal part 107. However, in the present invention, any small amount of water molecules which penetrates the outer seal is caught in filler region 108 and is incorporated in the liquid. Therefore, the water molecules loose their behavior as a gas and do not penetrate in inner seal part 105.

Particularly, in the case where a GH liquid crystal is used as filler 111, the water molecules are caught by the dye molecules, which have a large polarity, dissolved in the GH liquid crystal. Since the bonding force of the dye molecule and water molecule is large, the water molecules do not penetrate into the inner seal part 105 because the strong bonds between dye molecules and water molecules is not broken. Therefore, even in the case where a liquid crystal cell is exposed to a high humidity environment for a long period of time, reduction in resistance of the liquid crystal layer 103 does not occur, and deterioration in display quality because of a decrease in voltage retention can be prevented.

In the case where the seal part has a double structure and, therefore, the filler region 108 has a hollow shape, the small amount of water molecules which penetrate through the outer seal part 107 are cooled when they reach inner seal part 105, where they change into liquid water in filler region 108. Therefore, the inner seal part 105 is not exposed to water vapor and it is, therefore, believed that invasion of the water molecules into the liquid crystal layer 103 be prevented. However, because the water which gathers between the seal parts of the double structure can vaporize, the filler region 108 is again filled with water molecules changed to vapor form, which penetrate inner seal part 105 thereby invading the liquid crystal layer 103. In particular, under a high temperature and high humidity environment, invasion of water molecules cannot be prevented very well.

On the other hand, in the embodiment where the filler 111 is placed in the filler region 108 between the seal parts, the small amount of water molecules which penetrate through the outer seal part 107 are caught by the filler 111 and thus do not vaporize in the filler region 108. Therefore, the invasion of water molecules into the liquid crystal layer 103 can be effectively prevented even under a high temperature and high humidity environment.

A second embodiment of the invention is described with reference to FIG. 3.

Figure 2:
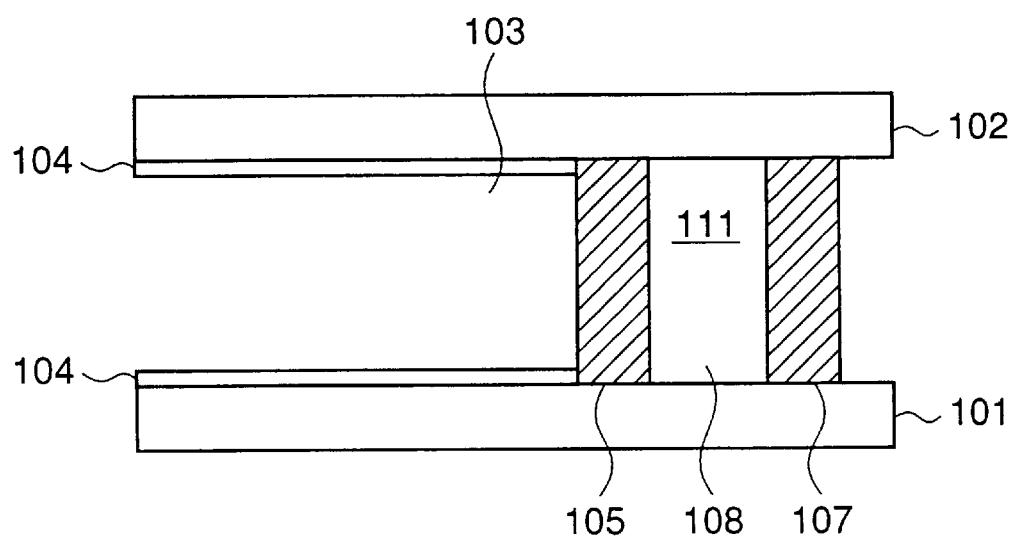
FIG. 2 is a schematic cross-sectional view on line a–a' in FIG. 1.
Figure 3:
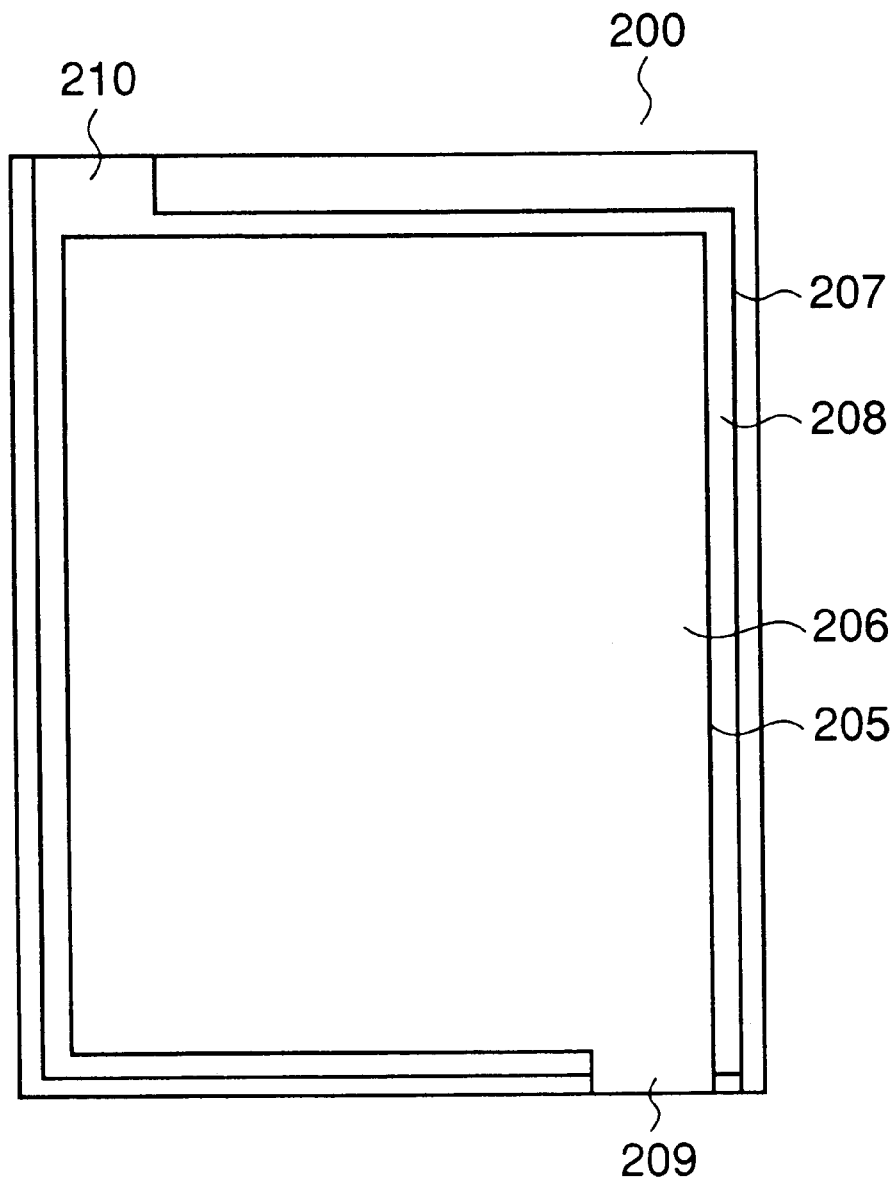
FIG. 3 is a schematic plan view of a liquid crystal cell of a second embodiment of the invention.

FIG. 3 is a schematic plan view of a liquid crystal cell 200 relating to the second embodiment. The partial cross-sectional view thereof is the same as FIG. 2.

In the liquid crystal cell 200 of this embodiment, an inlet 209 of a display region 206 and an inlet 210 of a filler region 208 are provided at different positions.

In the case where the same liquid crystal fills both the filler region 108 and the display region 106 as in the first embodiment, it is preferred to form the inlets at the same position, but in the case where a filler different from the display region 206 fills the filler region 208, it is preferred that the inlets be located at different positions. That is, mixing of the liquid crystal and the filler at the inlets upon filling can be prevented by locating the inlets at different positions.

As the filler fills filler region 208, a water absorbing substance, such as fine particles of silica gel, and a liquid comprising an appropriate medium having the water absorbing substance dispersed therein are preferably used. For example, a silicone oil can be used as the medium. In the case where fine particles of silica gel are wrapped with a polymer film, water molecules invading from the outside are adsorbed by the fine particles of silica gel and cannot escape to the outside of the polymer film. It is also possible to disperse the fine particles of silica gel in a silicone oil.

In the liquid crystal cell 200 of the second embodiment, the small amount of water molecules penetrating through the outer seal part 207 are trapped by the filler in the filler region 208 and do not penetrate into the inner seal part 205. Therefore, even in the case where the liquid crystal cell is exposed to a high humidity environment, reduction in resistance of the liquid crystal layer 203 does not occur, and deterioration in display quality caused by reduction in voltage retention does not occur.

In the first and second embodiments, the locations and the numbers of the inlets are not limited to those shown in the figures but can be appropriately changed.

Test results are described below which were obtained when the liquid crystal cells according to the first and second embodiments and a liquid crystal cell of Comparative Example 1 (Conventional Example) were allowed to stand under the same environment.

EXAMPLE 1

A liquid crystal cell having a distance between substrates of 10 μm and having the cell structure shown in FIG. 1 is produced. A sealing agent XN-256A, produced by Mitsui Chemical Co., Ltd., is used as the inner and outer sealing parts. The liquid crystal material employed is one obtained by using LIXON 5052 produced by Chisso Corp. as a base, in which a yellow dye D80 produced by BDH Chemicals Corp., a magenta dye G-176 produced by Nippon Kanko Shikiso Research Institute Co., Ltd. and a cyan dye SI-497 produced by Mitsui Chemical Co., Ltd. are dissolved and adjusted for blackness. The black GH liquid crystal is placed in the display region 106 and the filler region 108 of the liquid crystal cell, and the inlets 109 and 110 are sealed thereby obtaining a GH type liquid crystal cell.

EXAMPLE 2

A liquid crystal cell having a distance between substrates of 10 μm and having the cell structure shown in FIG. 2 is produced. The material of the inner and outer seal parts and the liquid crystal material are the same materials as employed in Example 1. A medium obtained by dispersing fine particles of silica gel having a particle diameter which has been adjusted to 50 nm, in a silicone oil is placed in filler region 208, thereby resulting in a GH type liquid crystal cell.

EXAMPLE 3

As a sealing agent, the sealing agent of Example 1, in which 20% by weight of trifluorochloroethylene is mixed and benzoyl peroxide (BPO) as a thermal polymerization initiator is added, is used. Other than this, a GH type liquid crystal cell is produced in the same structure and with the same materials. The sealing agent used in Example 3 is a material that has a higher dampproofness than the sealing agent in Example 1.

COMPARATIVE EXAMPLE 1

Figure 15:
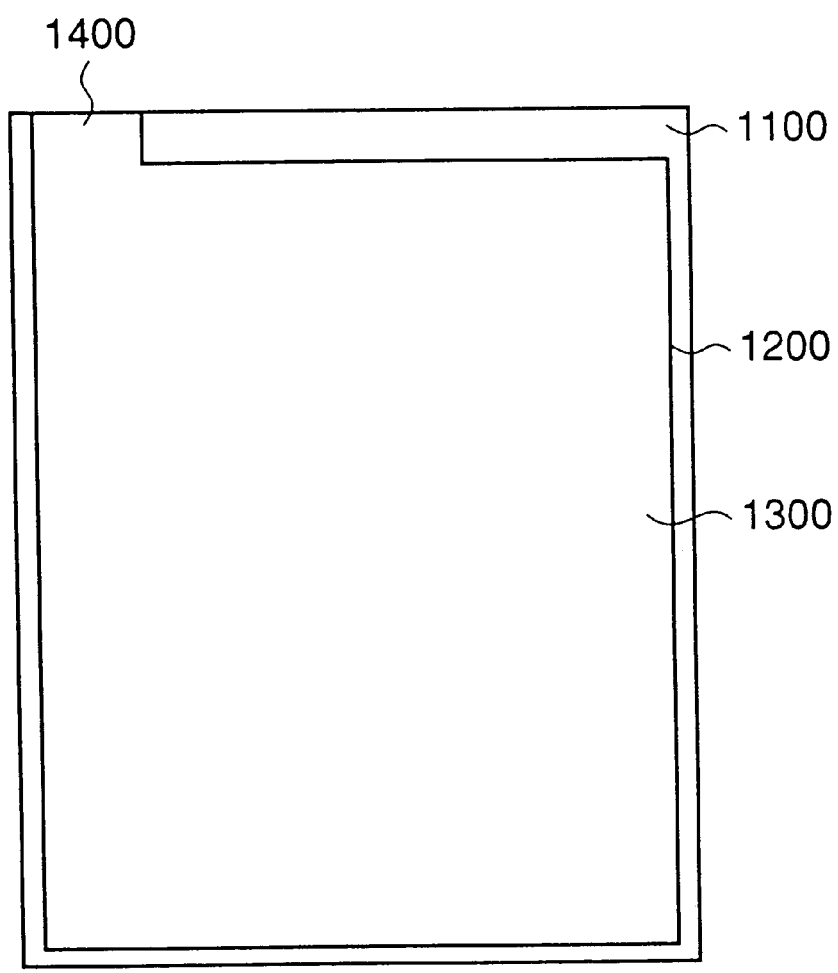
FIG. 15 is a schematic plan view of the device of Comparative Example 1.

A liquid crystal cell having the conventional structure is produced as Comparative Example 1. As shown in FIG. 15, a display region 1300 divided by a single seal part 1200 is formed on a substrate 1100, into which a black GH type liquid crystal having the same composition as described in Example 1 is placed, followed by sealing inlet 1400, thereby obtaining a GH type liquid crystal cell.

Two groups A and B are prepared of four cells each, the four cells of each group being the cells of Examples 1–3 and Comparative Example 1. A total of eight cells is employed.

The groups A and B are measured for voltage retention before the test. At this time, the measuring temperature for the group A is 24° C. (room temperature) and the measuring temperature for the group B is 70° C. The time over which the voltage retention is maintained is 16.7 ms (frame frequency: 60 Hz) corresponding to an image signal of one frame, and the application voltage is 5 V in rectangular pulse. This is measured in such a manner that a constant voltage is applied to a pixel electrode and a counter electrode on the array substrate, and after 16.7 ms, the voltage between the pixel electrode and the counter electrode is again measured, so as to measure the reduction of the voltage in percentage from the voltage initially applied.

The liquid crystal cells of the two groups are then allowed to stand under an environment of a humidity of 80% and a temperature of 70° C. for 500 hours.

Thereafter, the voltage retention (%) at a retention time of 16.7 ms is again measured. At this time, the measuring temperature for group A is 24° C. (room temperature) and the measuring temperature for group B is 70° C.

The measurement results are shown in Table 1 below.

TABLE 1

|  | Group A | | Group B | |
| --- | --- | --- | --- | --- |
|  | Before test | After standing 500 hrs | Before test | After standing 500 hrs |
| Example 1 | 99.5 | 99.3 | 99.0 | 98.5 |
| Example 2 | 99.5 | 99.0 | 99.0 | 97.5 |
| Example 3 | 99.5 | 99.5 | 99.0 | 99.0 |
| Comparative Example 1 | 99.5 | 93.0 | 99.0 | 17.5 |

It is understood from the test results in Table 1 that the liquid crystal cells of Examples 1–3 provide high value of voltage retention of 97% or more in both groups A and B. In particular, Example 3 provides a voltage retention exceeding Example 1 because of the high dampproofness of the trifluorochloroethylene resin.

In Comparative Example 1, on the other hand, it is confirmed that the voltage retention widely decreases in both groups A and B. Particularly, in group B, the decrease in voltage retention is conspicuous, and it is found that reliability under high temperature and high humidity environment is extremely poor.

While there is a possibility that the voltage retention is influenced by incident ultraviolet radiation on the display region, it is found from the additional experiment below that this influence can be ignored.

A liquid crystal cell having the same structure as FIG. 15 is produced, and a UV filter is attached on the surface thereof. The liquid crystal cell is measure for voltage retention before and after light irradiation of 340 mJ/m$^2$ from a xenon lamp. As a result, it is confirmed that the retention is decreased by only about 1%. It is found from this result that the major factor of decrease in voltage retention is the invasion of water into the liquid crystal layer in the display region.

The liquid crystal cells of the first and second embodiments described in the foregoing do not bring about reduction in resistance of the liquid crystal layer even when they are exposed to a high humidity environment for a long period of time. Therefore, deterioration in display quality because of a decrease in voltage retention can be prevented. Particularly, in a liquid crystal display device of TFT driven by a GH type liquid crystal, excellent display quality can be maintained, and a liquid crystal cell of high reliability can be provided. Since the filler region is provided by the double seal part structure, invasion of water into the display region can be well prevented. Furthermore, while in the conventional single seal member, the thickness of the seal member is increased to prevent invasion of water, the thickness of the sealing member can be decreased according to the findings of this invention.

The liquid crystal cell of the invention is suitable for liquid crystal display devices that are exposed to a severe environments, such as in marine use.

Figure 4:
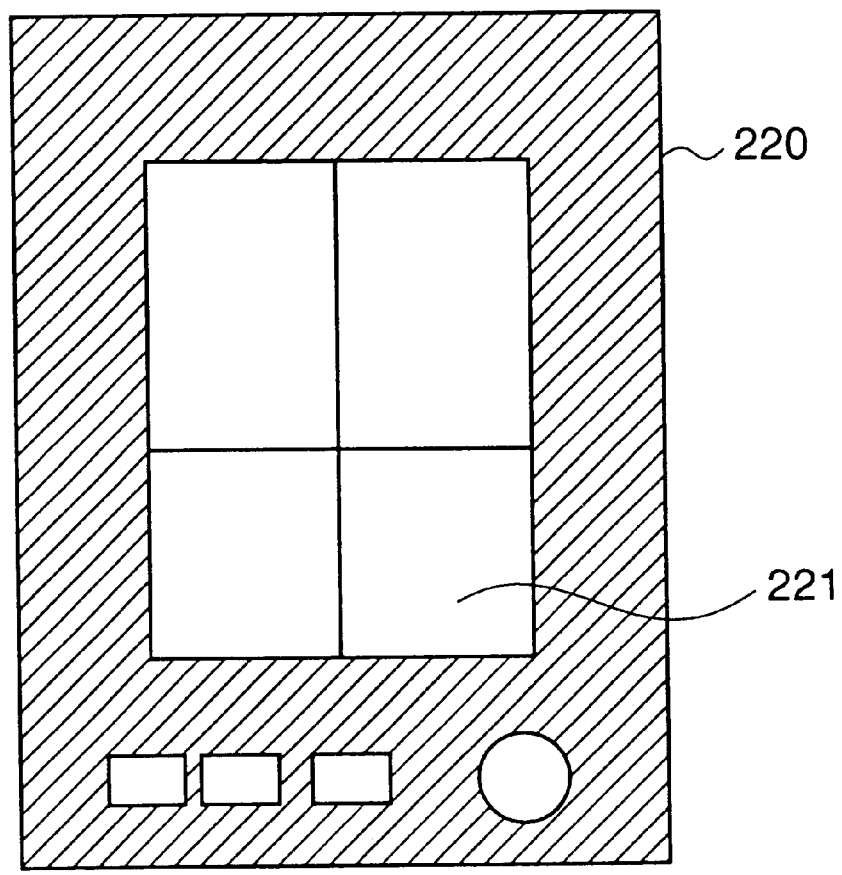
FIG. 4 is an example of an outside view of a conventional GPS display for marine use.
Figure 5:
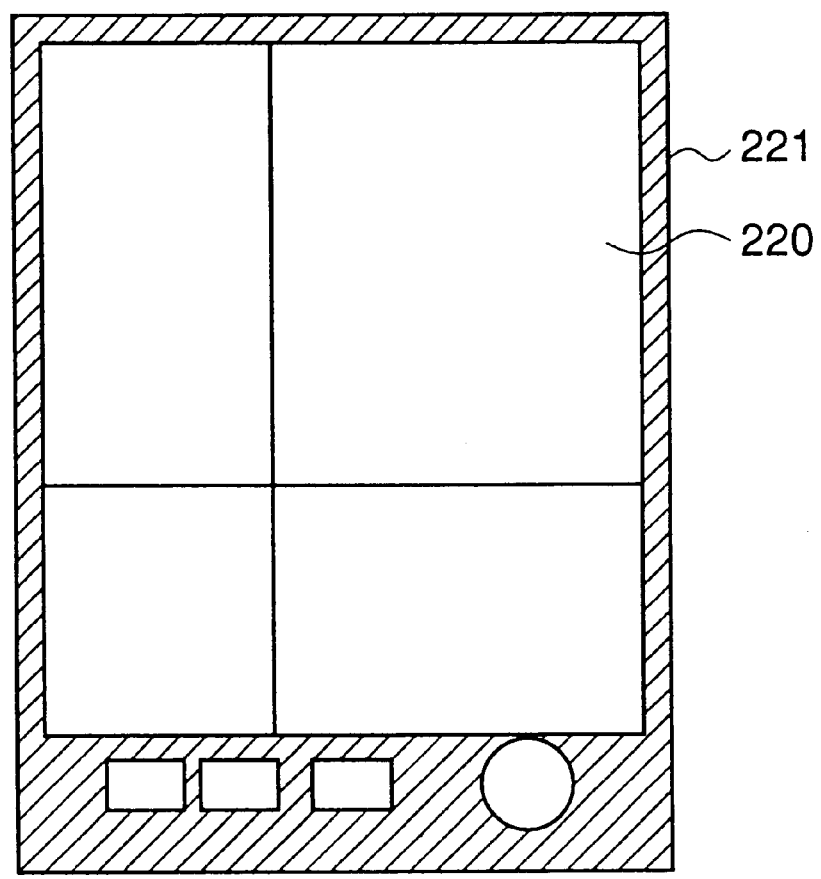
FIG. 5 is an example of an outside view of a GPS display for marine use, to which a liquid crystal cell of the invention is applied.

For example, in the case of displays in GPS devices used in marine applications, as shown in FIG. 4, a waterproof frame 220 having a large outer dimension and a heavy weight in comparison to a display screen 221 is required. However, according to the invention, since a large and heavy waterproof frame is not required as shown in FIG. 5, the proportion of the display region 222 with respect to the outer frame 221 can be increased. Accordingly, the display can be easily seen even under miniaturization and weight saving savings manufacturing conditions.

A third embodiment of the invention is described with reference to FIGS. 6, 7 and 8.

Figure 6:
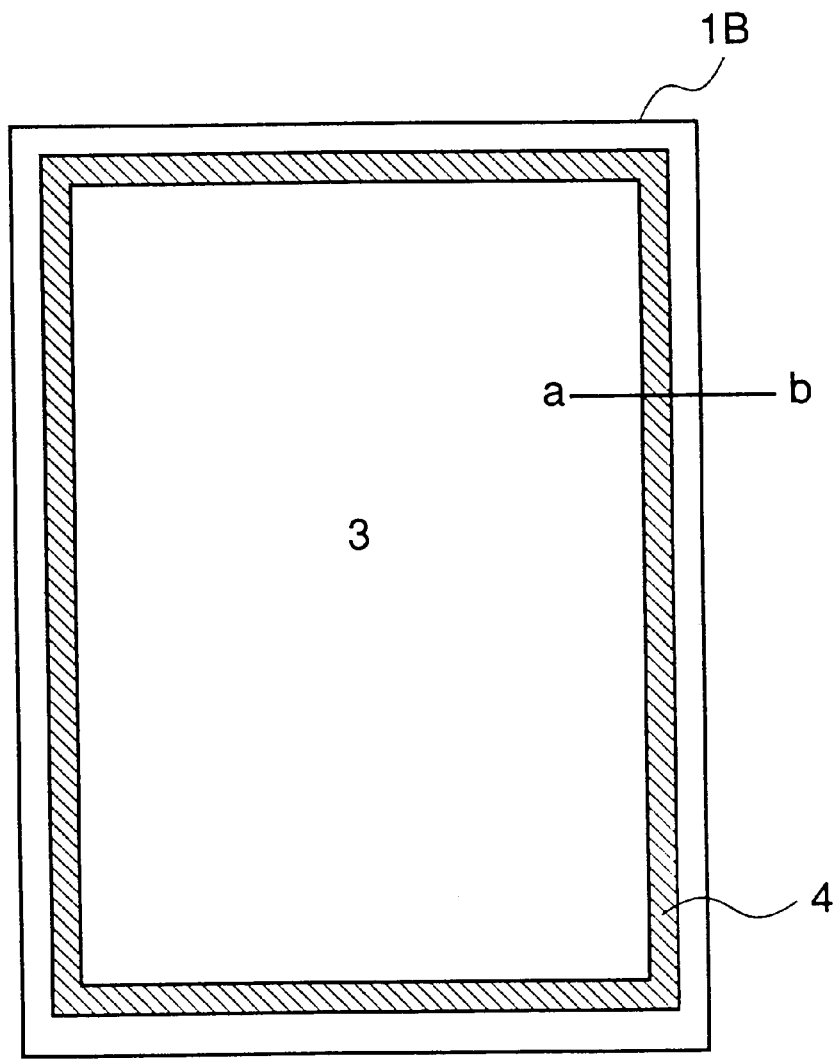
FIG. 6 is a schematic plan view of a liquid crystal cell of a third embodiment of the invention.
Figure 7:
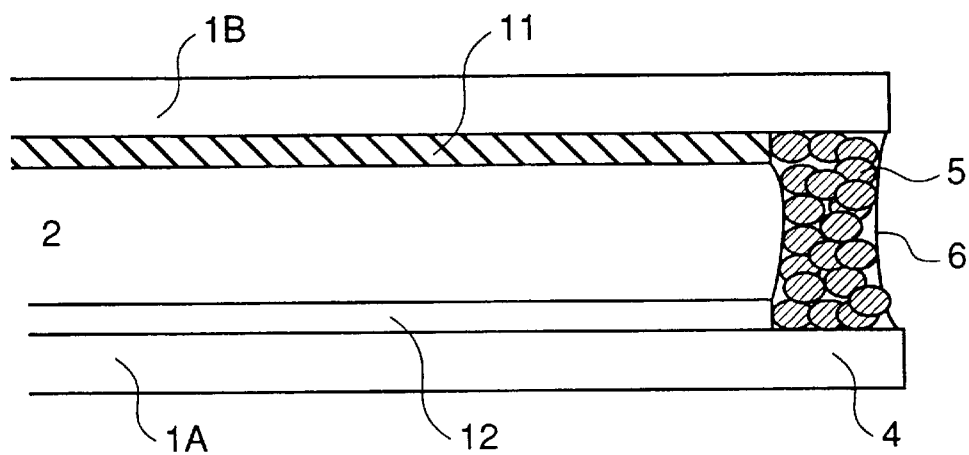
FIG. 7 is a schematic cross-sectional view on line a–b in FIG. 6.
Figure 8:
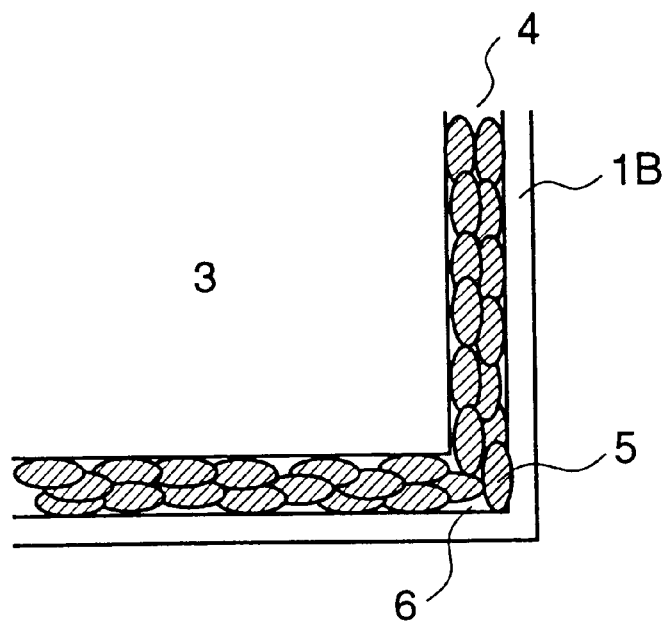
FIG. 8 is a partial enlarged view of a peripheral part of a liquid crystal cell of the third embodiment of the invention.

FIG. 6 is a schematic diagram of the third embodiment of the invention, and FIG. 7 is a cross-sectional view on line a–b in FIG. 6. FIG. 8 is a partial enlarged view of a seal part in FIG. 6.

A liquid crystal layer 2 is sandwiched by a substrate 1A and a counter substrate 1B. Herein, pixel electrodes, signal lines and scanning lines forming a pixel are formed on the substrate 1A in the conventional manner. In FIG. 7, a symbol 12 is attached to all the signal lines. For example, in an active matrix type liquid crystal display device using TFT, TFT and the pixel electrodes are formed on the substrate 1A, and common electrodes 11 are formed on the other one. On the counter electrode 1B, common electrodes 11 are formed.

The invention is applicable in a structure where the liquid crystal layer 2 is sandwiched and is effective regardless of the material of the liquid crystal. In particular, the invention is effective in a GH type liquid crystal.

A display region 3 in liquid crystal layer 2 is formed on the substrate 1. The outer periphery of the display region 3 is formed by a sealing part 4.

The sealing part 4 comprises polymer fine particles 5 containing a hygroscopic compound and a binder part 6 filling the gaps among the polymer particles 5.

Suitable examples of the hygroscopic compound include $P_2O_5$, $Mg(ClO_4)_2$, $SiO_2$, $CaSO_4$, $CaCl_2$ and $CuSO_4$. While these substances are normally in a solid state, they can be formed into a powder and dispersed in a silicone oil, nujol or a liquid crystal. A liquid crystal having a polar compound, such as a dye, dispersed therein can also be used.

Suitable examples of a film material of the fine particles of polymer 5 containing a hygroscopic compound include substantially all polymers including a polyethylene compound, a chlorinated polyethylene compound, an ethylene copolymer, such as an ethylene-vinyl acetate copolymer and an ethylene-acrylic acid-maleic anhydride copolymer, a polybutadiene compound, a polyester compound, such as polyethylene terephthalate, polybutylene terephthalate and polyethylene naphthalate, a polypropylene compound, a polyisobutylene compound, a polyvinyl chloride compound, a natural rubber compound, a polyvinylidene compound, a polyvinyl acetate compound, a polyvinyl alcohol compound, a polyvinyl acetal compound, a polyvinyl butyral compound, a tetrafluoroethylene resin, a trifluoroethylene compound, a fluoroethylene-propylene resin, a vinylidene fluoride resin, a vinyl fluoride resin, a tetrafluoroetheylene copolymer, such as a tetrafluoroethylene-perfluoroalkoxyethylene copolymer, a tetrafluoroethylene-perfluoroalkyl vinyl ether copolymer, a tetrafluoroethylene-hexafluoropropylene copolymer and a tetrafluoroethylene-ethylene copolymer, a fluorine resin, such as fluorine-containing polybenzoxazole, an acrylic resin, a methacrylic resin, a fumaric acid resin, a maleic acid resin, a polyacrylonitrile, an acrylonitrile copolymer, such as an acrylonitrile-butadiene-styrene copolymer, polystyrene, a styrene-acrylonitrile copolymer, an acetal resin, a polyamide compound, such as nylon 66, a polycarbonate compound, a polyestercarbonate compound, a cellulose resin, a phenol resin, a urea resin, an epoxy resin, an unsaturated polyester resin, an alkyd resin, a melamine resin, a polyurethane compound, a diallyl phthalate compound, a polyphenyleneoxide compound, a polyphenylenesulfide compound, a polysulfone compound, a polyphenylsulfone compound, a silicone resin, a polyimide compound, a bismaleimide triazine compound, a polyimideamide compound, a polyetherimide compound, a polyvinyl carbazole compound, a norbornene series amorphous polyolefin, and a cellulose compound.

Suitable examples of the binder 6 present in gaps among the fine particles of polymer 5 include a polyethylene compound, a chlorinated polyethylene compound, an ethylene copolymer, such as an ethylene-vinyl acetate copolymer and an ethylene-acrylic acid-maleic anhydride copolymer, a polybutadiene compound, a polyester compound, such as polyethylene terephthalate, polybutylene terephthalate and polyethylene naphthalate, a polypropylene compound, a polyisobutylene compound, a polyvinyl chloride compound, a polyvinylidene chloride compound, a polyvinyl acetate compound, a polyvinyl alcohol compound, a polyvinyl acetal compound, a polyvinyl butyral compound, a tetrafluoroethylene resin, a trifluorochloroethylene resin, a fluoroethylene-propylene resin, a vinylidene fluoride resin, a vinylfluoride resin, a tetrafluoroethylene copolymer, such as a tetrafluoroethylene-perfluoroalkoxyethylene copolymer, a tetrafluoroethylene-perfluoroakyl vinyl ether copolymer, a tetrafluoroethylene-hexafluoropropylene copolymer and a tetrafluoroethylene-ethylene copolymer, a fluorine resin, such as fluorine-containing polybenzoxazole, an acrylic resin, a methacrylic resin, such as polymethyl methacrylate, a polyacrylonitrile compound, an acrylonitrile copolymer, such as a acrylonitrile-butadiene-styrene copolymer, a polystyrene compound, a halogenated polystyrene compound, a styrene copolymer, such as a styrene-methacrylic acid copolymer and a styrene-acrylonitrile copolymer, an ionic polymer, such as sodium polystyrenesulfonate and sodium polyacrylate, an acetal resin, a polyamide compound, such as nylon 66, gelatin, gum arabic, a polycarbonate compound, a polyester polycarbonate compound, a cellulose series resin, a phenol resin, a urea resin, an epoxy resin, an unsaturated polyester resin, an alkyd resin, a melamine resin, a polyurethane compound, a diallylphthalate resin, a polyphenylene oxide compound, a polyphenylene sulfide compound, a polysulfone compound, a polyphenyl sulfone compound, a silicone resin, a polyimide compound, a bismaleimide triazine resin, a polyimideamide compound, a polyethersulfone compound, a polymethylpentene compound, a polyether ether ketone compound, a polyetherimide compound, a polyvinylcarbazole compound, and a thermoplastic resin, such as a norbornene series amorphous polyolefin. The binder can be used in such a manner that the binder may be dissolved in water, in which the fine particles of polymer are dispersed, in the case where the binder is water soluble, and may be dispersed in water as an emulsion, to which the fine particles of polymer 5 are mixed, in the case where the binder is water insoluble.

Examples of the methods of production of the fine particles of polymer 5 include a film emulsifying method, a phase separation method, an in-liquid drying method, a interface polymerization method, an in situ polymerization method, an in-liquid film hardening method and a spray drying method.

An example is described below, in which an emulsion polymerization method is applied to a GH type liquid crystal having a dichroic dye as a hygroscopic compound dissolved in the liquid crystal.

The fine particles of polymer 5 are produced in the following manner.

About 80 parts by weight of ZLI-1840 produced by Merck & Co., Inc. as a nematic liquid crystal having a positive dielectric anisotropy, about 1 part by weight of G-176 produced by Nippon Kanko Shikiso Research Institute Co., Ltd. as a magenta dichroic dye, about 7 parts by weight of a hydrophilic methyl methacrylate monomer, about 7 parts by weight of a hydrophobic isobutyl methacrylate monomer, about 1 part by weight of ethylene glycol dimethacrylate as a crosslinking agent, and about 0.2 part by weight of benzoyl peroxide are mixed and dissolved thereby forming a liquid crystal composition.

Separately, about 3 parts by weight of polyvinyl alcohol and about 300 parts by weight of pure water are emulsified in a homogenizer. The emulsified polyvinyl alcohol and the liquid crystal composition are polymerized at about 85° C.

After polymerization for about one hour, the material is filtered through a filter of about 1 μm to remove fine particles of polymer which are too small, followed by washing three times with pure water, so as to obtain fine particles of polymer wrapped with a transparent polymer film having an average particle diameter of about 3 μm. The particle diameter of the fine particles of polymer can be adjusted by the rate of agitation rate upon polymerization and by the pore diameter of the fine pores of the emulsion film.

The fine particles of polymer are dispersed in pure water and mixed with, for example, Lumiflon produced by Asahi Glass Company, so as to form a sealing material containing the fine particles of polymer. The Lumiflon prepared herein has an average particle diameter of about 0.5 μm, and it is preferred that it is used after adjusting all the particles to a diameter of about 1 μm or less.

The sealing material thus produced is printed on the counter substrate 1B having an ITO layer by screen printing. The substrate having the printed sealing material is not limited to the counter substrate 1B but may be the substrate 1A. While the case of printing is described herein, it is possible that the fine particles of polymer can be coated, for example, by a brush.

The counter substrate 1B is heat fused to the substrate 1A, and a cell having the display region 3 is formed by the sealing part 4 having a width of about 1 μm. The height of the sealing part 4, i.e., the thickness of the liquid crystal layer 2, is, for example, about from 2–20 μm.

A liquid crystal material, LIXON 5052 produced by Chisso Corp., containing about 1 part by weight of G-176 produced by Nippon Kanko Shikiso Research Institute Co., Ltd., for example, is placed in the cell to complete the liquid crystal cell.

The liquid crystal cell thus obtained is allowed to stand under an environment of a temperature of about 70° C. and a humidity of about 80% for 500 hours to conduct a weather resistance test. The liquid crystal cell after standing for 500 hours is measured for voltage retention under the conditions of a measuring temperature of 80° C. and a retention time of 500 ms, and high reliability of 98% can be realized. The voltage retention referred to herein is of such a value that while the voltage initially applied is assumed to 100%, the voltage is measured after lapsing the retention time from the termination of the application of the voltage, and the ratio of the initial voltage to the voltage after lapsing the retention time is expressed in terms of percentage.

Water vapor invading the seal part 4 penetrates through the polymer wall of the fine particles of polymer 5 is adsorbed by the dye as a polar compound present in the fine particles of polymer 5, so as to be a part of the liquid crystal liquid. The water molecules as a liquid cannot penetrate the polymer wall again, and the water molecules are trapped inside the fine particles of polymer 5. Therefore, the water vapor cannot invade the GH type liquid crystal in display region 3.

The seal part 4 may be formed only with the fine particles of polymer 5. However, it is preferred to use a binder 6 which aids fusion of the fine particles of polymer 5 to each other. Furthermore, it is preferred that binder 6 be a polymer member that has an excellent dampproofness effect.

There is a possibility of the presence of water vapor among the fine particles of polymer 5, but water vapor cannot reach the display region 3. This is because the water vapor which invades moves by twisting and turning among the fine particles of polymer 5, whereby the distance of movement of the particles reaches several tens times the width of the seal.

According to the seal part 4 of the invention, a sufficient dampproofness effect can be obtained even though the width of the seal is small. Therefore, the sealing part of a cell having a narrow frame, which is the main objective at present, can be further narrowed.

COMPARATIVE EXAMPLE 2

A liquid crystal cell having a width of a seal wall of 1 μm is produced using a sealing agent XN-256A produced by Mitsui Chemical Co., Ltd. The same GH type liquid crystal as in the first embodiment is filled therein, and a weather resistance test is conducted. When the voltage retention is measured under the conditions of a measuring temperature of 80° C. and a retention time of 500 ms, it is 45%.

Such a large reduction in retention is caused by invasion of water into the display region.

A fourth embodiment of the invention will be described below with reference to FIG. 9.

Figure 9:
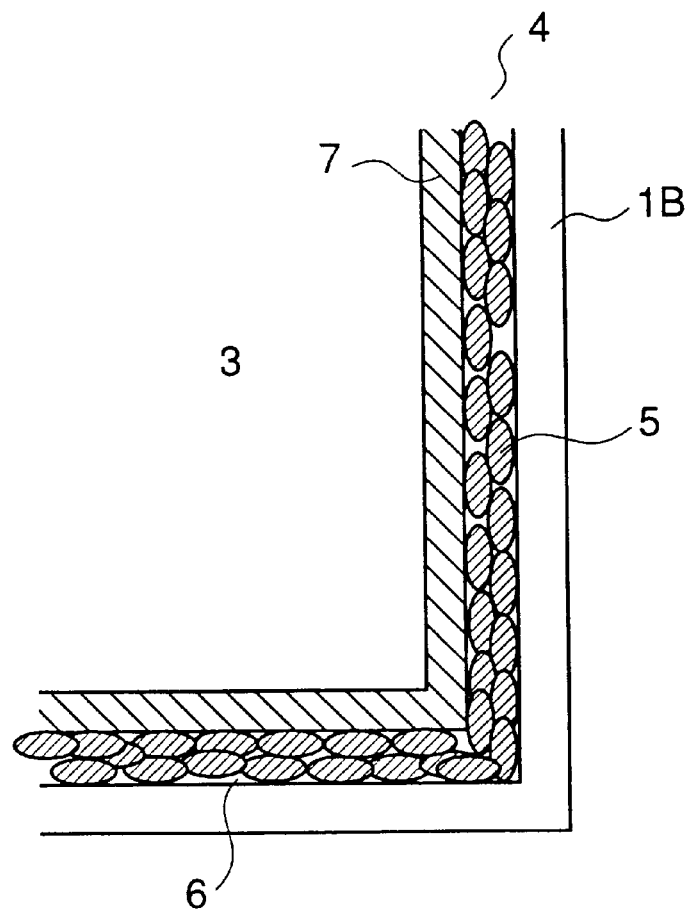
FIG. 9 is a partial enlarged view of a peripheral part of a liquid crystal cell of a fourth embodiment of the invention.

FIG. 9 is a schematic diagram showing the fourth embodiment of the invention and which shows an end part of the display region.

In this embodiment, a fine particle seal part 4 containing fine particles of the hygroscopic polymer is arranged in the outer periphery of an ordinary seal wall 7.

Similar to the third embodiment, a substrate 1A having signal line and scanning lines and a counter substrate 1B having common electrodes 11 are prepared.

It is preferred that the resin material used as the seal wall 7 has excellent dampproofness. For example, a resin material containing a halogenated ethylene resin, such as a trifluorinated chlorinated ethylene resin, a tetrafluorinated ethylene resin, a difluorinated dichlorinated ethylene resin, a monofluorinated trichlorinated ethylene resin and a tetrachlorinated ethylene resin, is used.

The resin material is coated, for example, by a screen printing method, on one of the substrate 1A and the counter substrate 1B, so as to form the seal wall 7 having a width of 1 μm on the substrate.

The fine particle of seal part 4 containing the fine particles of hygroscopic polymer 5 and the binder 6 is formed on the outer periphery of the seal wall 7 in a manner similar to the first embodiment. The width of the seal part 4 can be appropriately determined and, for example, may be similar to seal wall 7.

A double dampproofness structure comprising seal wall 7 and seal part 4 on the outer periphery thereof is obtained.

Thereafter, substrate 1A and counter substrate 1B are crimped to form a liquid crystal cell. A GH type liquid crystal is placed therein in the same manner as in the third embodiment to complete a liquid crystal display device.

The liquid crystal cell thus obtained is subjected to the weather resistance test. The liquid crystal cell is measured for voltage retention under the conditions of a measuring temperature of 80° C. and a retention time of 500 ms, and high reliability of 98% can be realized.

Figure 10:
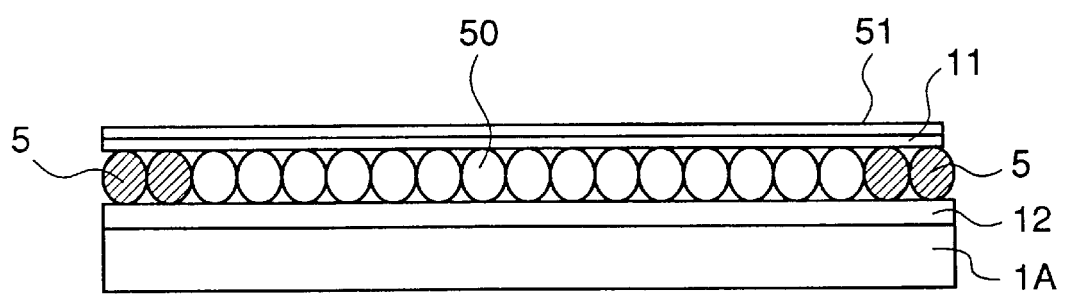
FIG. 10 is a schematic plan view of a liquid crystal cell of a fifth embodiment of the invention.

A fifth embodiment of the invention will be described below with reference to FIG. 10.

This embodiment is a liquid crystal display device of a single plate type, in which a liquid crystal layer is formed on one substrate, and a polymer protective film is formed thereon.

A substrate 1A having signal lines and scanning lines 12 formed thereon is used in a manner similar to the third embodiment.

Liquid crystal microcapsules 50 are printed on the substrate 1A to form the liquid crystal layer. The liquid crystal layer constitutes an image display part.

Hygroscopic fine particles of polymer 5 are also printed on the periphery of the substrate 1A to form a dampproof seal.

A coating type of ITO material is prepared by dispersing ITO in a binder and then coating the material thereon to form a counter electrode 11. A protective film 51 of a polymer is formed on the counter electrode 11 to complete the liquid crystal display device.

According to this construction, the sealing part can be formed by a process similar to that by which the liquid crystal layer is formed.

The dampproofness effect of the invention can be exhibited in an organic solar cell. The members of the organic solar cell, particularly the hole transporting part, comprise an organic electrolyte, which is very hygroscopic.

However, when water invades the interior of the cell, it results in deterioration of the members of the solar cell. Such deterioration can be prevented by using the fine particles of hygroscopic polymer according to the invention in the sealing part.

The electrolyte, as the hole transporting part of the solar cell, gradually evaporates over a long period of time resulting in a decrease of the photoelectric conversion efficiency. The fine particles of hygroscopic polymer of the invention not only prevent invasion of moisture from the outside, but also dissipation of the volatile member inside is prevented.

A sixth embodiment of the invention is described below with reference to FIGS. 11 and 12.

Figure 11:
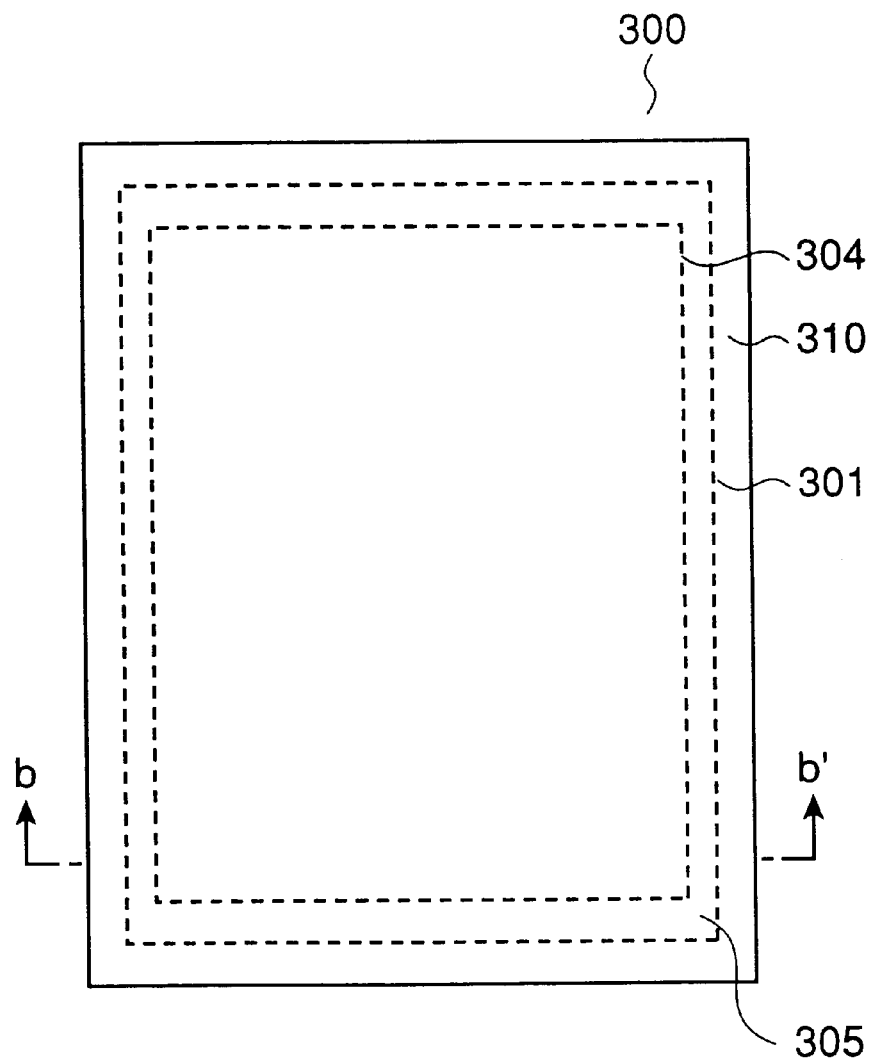
FIG. 11 is a schematic plan view of a liquid crystal cell of a sixth embodiment of the invention.

FIG. 11 is a schematic constructive view of a liquid crystal cell 300 according to the sixth embodiment. FIG. 12 is a schematic cross-sectional view on line b–b' in FIG. 11.

The entire liquid crystal cell 300 is covered with a protective film 310 comprising a halogenated ethylene resin in pouch form.

A liquid crystal display panel of this embodiment comprises, similar to the conventional one, a liquid crystal 303 sandwiched by an array substrate 301 and a counter substrate 302, the peripheral part of which is sealed with an ordinary sealing part 305. The region where the liquid crystal is placed is display region 304.

The protective film 310 covers the entirety of the liquid crystal display panel thus constituted. The protective film 310 not only covers the surface of the substrate, but also is within the gap between the array substrate 301 and the counter substrate 302 and in contact with the seal part 305.

Thus, in the peripheral part of the liquid crystal panel, the protective film 310 closely covers the substrates without any spaces to have a cross-sectional shape which is substantially a T shape. Herein, an example is described where the seal part 305 is provided inside with respect to the array substrate 301 and the counter substrate 302, whereby the cross-sectional shape of the protective film becomes a T shape. However, here it is possible that the seal part aligns with the peripheral portions of the substrates.

In the case of a liquid crystal cell, to which a polarizing plate is attached, the protective film 310 is covered after attaching the polarizing plate on the outside of the substrate. For the protective film it is preferred to use a halogenated ethylene resin selected from the group of a trifluorinated chlorinated ethylene resin, a trifluorinated ethylene resin, a difluorinated dichlorinated ethylene resin, a monofluorinated tetrachlorinated ethylene resin and a tetrachlorinated ethylene resin, or a resin material containing one or plural resins selected from this group.

According to the liquid crystal cell 300 of this embodiment, in the case where the liquid crystal cell is exposed to the high humidity environment, the protective film 310 is exposed to water vapor molecules. However, because the halogenated ethylene resin of the protective film 310 has excellent dampproofness, water molecules do not penetrate through the protective film 310 to reach the display region 304. Therefore, even in the case where the liquid crystal cell is exposed to a high humidity environment for a long period of time, the resistance of the liquid crystal layer 303 is not decreased, and deterioration in display quality caused by decrease in voltage retention can be prevented. Furthermore, since the protective film is formed in addition to the conventional seal part in the liquid crystal cell 300, the thickness of the seal part can be decreased in comparison to the conventional one. Therefore, miniaturization and weight savings of the liquid crystal display device can be realized, while enabling the fabrication of a liquid crystal display device which can be easily seen.

While the protective film 310 covering the entire outer periphery of the cell does not influence the image display, since it is transparent and colorless, the dampproofness is not influenced even though a part thereof corresponding to the display region 304 is removed.

The power supply lines and the signal input lines of the liquid crystal cell 300 is preferably formed from an electroconductive resin as the conductive part.

A seventh embodiment of the invention will be described below with reference to FIGS. 13 and 14.

Figure 13:
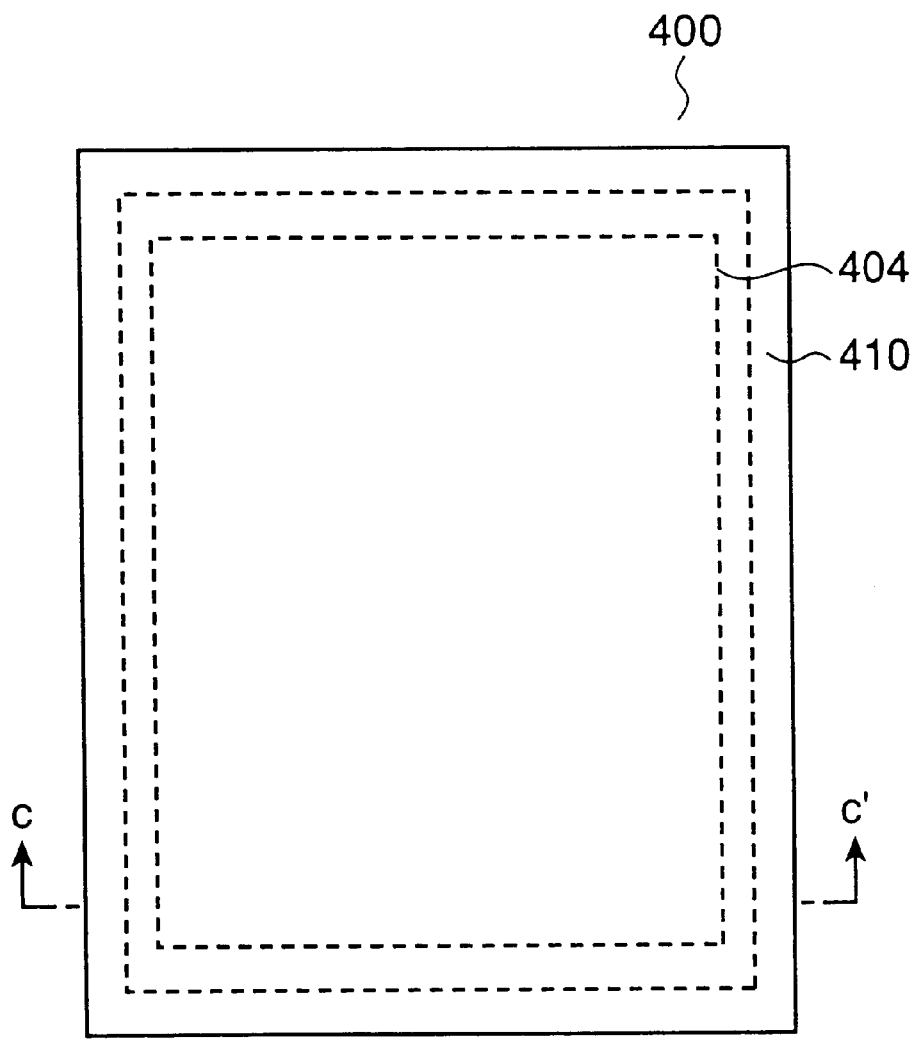
FIG. 13 is a schematic plan view of a liquid crystal cell of a seventh embodiment of the invention.

FIG. 13 is a schematic constructive diagram of a liquid crystal cell 400 according to this embodiment. FIG. 14 is a schematic cross-sectional view on line c–c' in FIG. 13.

In the liquid crystal cell 400 of this embodiment, the peripheral four edges of the cell are covered with a protective film 410 of a frame shape comprising a halogenated ethylene resin. An ordinary seal part 405 is formed between the substrates also in the liquid crystal cell 400, and a liquid crystal 403 is placed in the display region 404 divided by the seal part. The protective film 410 not only covers the edge part of the substrate, but also gets into the gap between the array substrate 401 and the counter substrate 402, so as to cover the substrate without any space to form a substantial T shape.

As the halogenated ethylene resin, one of the same resins used in the sixth embodiment can be employed.

In the liquid crystal cell 400, because the halogenated ethylene resin as the protective film 410 has excellent dampproofness, water molecules do not penetrate through the protective film to reach display region 404. Therefore, even in the case where the liquid crystal cell is exposed to a high humidity environment for a long period of time, the resistance of the liquid crystal layer 403 is not decreased, and deterioration in display quality caused by decrease in voltage retention can be prevented. Furthermore, with respect to the liquid crystal cell 400, the miniaturization and weight savings of the liquid crystal display device can be realized as shown in FIG. 4, and the liquid crystal display device can be easily seen.

Test results will be described below that are obtained when the liquid crystal cells according to the sixth and seventh embodiments and a liquid crystal cell of Comparative Example 3 (Conventional Example) are allowed to stand under the same environment.

EXAMPLE 4

The liquid crystal material, LIXON 5052 produced by Chisso Corp. is employed. This material is combined with a dichroic dye, SI-497 produced by Mitsui Chemical Co., Ltd. (cyan, 1.6% by weight), D80 produced by BDH Chemicals Corp. (yellow, 2.2% by weight) and G-176 produced by Nippon Kanko Shikiso Research Institute Co., Ltd. (magenta, 1.7% by weight). An amount of 0.8% by weight of S811 produced by Merck & Co., Inc. is dissolved as a chiral agent. The GH liquid crystal is placed in a liquid crystal cell where the gap between the substrates is adjusted to 10 µm, so as to produce a GH type liquid crystal cell.

Figure 12:
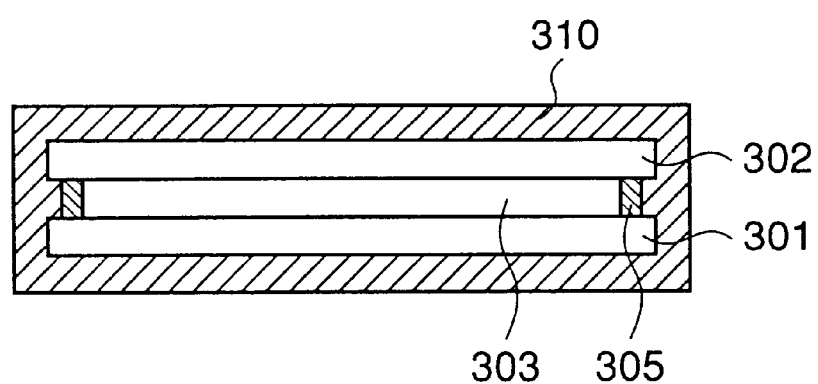
FIG. 12 is a schematic cross-sectional view on line b–b1 in FIG. 11.

Furthermore, the entire outer periphery of the GH type liquid crystal cell is covered with a trifluorinated ethylene resin in a pouch form having an adhesive layer on one side thereof, so as to obtain a GH type liquid crystal cell having the cell structure shown in FIG. 12. The adhesive layer increases the adhesiveness of the protective film, and the protective film can be closely adhered to the substrates by conducting a heat treatment upon covering with the protective film.

EXAMPLE 5

The same GH type liquid crystal as in Example 4 is placed in a liquid crystal cell having a gap between substrates adjusted to 10 µm.

Figure 14:
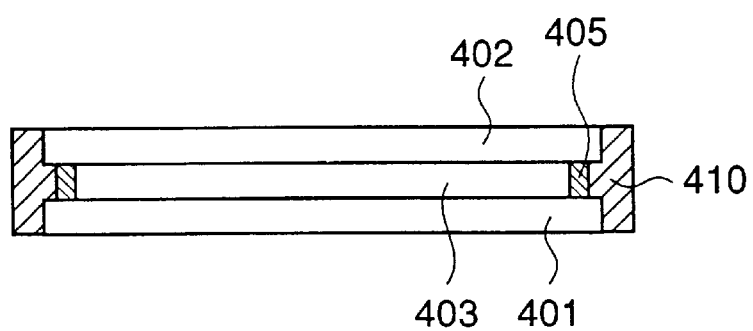
FIG. 14 is a schematic cross-sectional view on line c–c' in FIG. 13.

Furthermore, the GH type liquid crystal cell is covered with a trifluorinated ethylene resin in a pouch form having an adhesive layer on one side thereof in a frame form, so as to prepare a GH type liquid crystal cell shown in FIG. 14.

COMPARATIVE EXAMPLE 3

In this Comparative Example, the GH type liquid crystal is placed in a liquid crystal cell having a distance between substrates adjusted to 10 µm to obtain a GH type liquid crystal cell. In the liquid crystal cell of Comparative Example 2, XN-256A produced by Mitsui Chemical Co., Ltd. is used a the seal material, and the cell is not covered with a protective film.

The liquid crystal cells of Examples 4 and 5 and Comparative Example 3 are measured for the voltage retention (%) before the test. At this time, the measuring temperature for the group A is 24° C. (room temperature). The time of maintaining the voltage retention is 500 ms, and the application voltage is 5 V in rectangular pulse. The liquid crystal cells are allowed to stand under the environment of a humidity (weather resistance humidity) of 80% and a temperature of 70° C. for 800 hours, and then the voltage retention (%) is measured at a measuring temperature of 24° C. (room temperature) and a retention time of 500 ms. The results are shown in Table 2 below.

TABLE 2

|  | Before test | After test |
| --- | --- | --- |
| Example 4 | 95.0 | 95.0 |
| Example 5 | 95.0 | 95.0 |
| Comparative Example 3 | 95.0 | 40.0 |

It is understood from the results shown in Table 2 that the liquid crystal cells of Examples 4 and 5 can provide, even after the severe conditions of a retention time of 500 ms in comparison to the foregoing Examples, a voltage retention which is equivalent to that before the test. Furthermore, when a lighting test of the liquid crystal cells is conducted after the test, neither burning nor reduction in contrast is observed.

In Comparative Example 3, on the other hand, it is confirmed that the voltage retention is remarkably decreased by 40%. When a lighting test is conducted after the test, burning is found in 40% of the liquid crystal cells among the plural liquid crystal cells of Comparative Example 3 simultaneously produced. It is understood from the test results that the liquid crystal cell of Comparative Example 3 has very low reliability under high humidity and high temperature environments, and invasion of water cannot be sufficiently prevented by the single sealing part of the conventional structure.

As described above, in the liquid crystal cell of the invention, the invasion of water vapor molecules into the liquid crystal layer can be effectively prevented even when the cell is exposed to a high humidity environment for a long period of time. Therefore, a decrease in resistance of the liquid crystal layer does not occur, and deterioration in display quality because of a decrease in voltage retention can be prevented. Furthermore, since the conventional waterproof frame of a large size and a heavy weight becomes unnecessary, the proportion of the display region with respect to the area of the outer frame decreases. Therefore, the display can be easily seen while the advantages of miniaturization and weight savings can be realized.

The invention can provide a liquid crystal cell of high reliability which not only realizes miniaturization, weight savings and improvement in appearance of the display, but also can maintain excellent display qualiiesy even under severe environments, such as encountered in marine applications. Furthermore, because a liquid crystal display device of TFT driven GH type liquid crystal cells can be put into practical use, which has been difficult, portable information equipment having excellent reliability exhibiting brilliant color displays can be realized.

The disclosures of Japanese applications P2000-72549 and P2000-277823 filed Mar. 15, 2000 and Sep. 13, 2000, respectively are hereby incorporated by reference into the present application.

Obviously, numerous modifications and variations of the present invention are possible in light of the above teachings. It is, therefore, to be understood that within the scope of the appended claims, the invention may be practiced otherwise than as specifically described herein.

What is claimed as new and is intended to be secured by Letters Patent is:

1. A liquid crystal display comprising:
   a substrate;

a liquid crystal layer disposed on said substrate; and a sealing part surrounding said liquid crystal layer and disposed on said substrate, wherein said sealing part comprises a hygroscopic solution.

2. The liquid crystal display according to claim 1, wherein said sealing part comprises:

an inner seal part; and an outer seal part, wherein said hygroscopic solution is disposed between said inner seal part and said outer seal part.

3. The liquid crystal display according to claim 2, further comprising:

a first inlet of said liquid crystal layer; and second inlets of said hygroscopic solution next to said first inlet.

4. The liquid crystal display according to claim 2, further comprising:

a first inlet of said liquid crystal layer; and second inlets of said hygroscopic solution opposite the side of said substrate on which said first inlet is disposed.

5. The liquid crystal display according to claim 2, wherein said hygroscopic solution is the same liquid crystal as said liquid crystal layer.

6. The liquid crystal display according to claim 2, wherein said hygroscopic solution comprises suspended hygroscopic compound particles.

7. The liquid crystal display according to claim 2, further comprising:

a counter substrate disposed on said liquid crystal layer.

8. The liquid crystal display according to claim 1, wherein said sealing part comprises polymer particles which involve said hygroscopic solution.

9. The liquid crystal display according to claim 8, wherein said hygroscopic solution is a guest-host type liquid crystal.

10. The liquid crystal display according to claim 8, wherein said sealing part further comprises a polymer seal wall.

11. The liquid crystal display according to claim 8, wherein said polymer particles are fine particles.

12. The liquid crystal display according to claim 8, wherein said polymer particles have an average diameter of 3 micrometers.

13. The liquid crystal display according to claim 1, wherein said hygroscopic solution comprises at least one material selected from the group consisting of $P_2O_5$, $Mg(ClO_4)_2$, $SiO_2$, $CaSO_4$, $CaCl_2$, and $CuSO_4$.

14. The liquid crystal display according to claim 1, wherein said liquid crystal layer consists of a guest-host type liquid crystal.

15. The liquid crystal display according to claim 1, wherein said hygroscopic solution comprises a silicone oil or a guest-host type liquid crystal.

16. The liquid crystal display according to claim 1, wherein said hygroscopic solution takes in vapor and changes said vapor to liquid.

17. A liquid crystal display comprising:

a pair of substrates;

a liquid crystal layer disposed between said substrates;

a seal part surrounding said liquid crystal layer and disposed on said substrates; wherein said seal part comprises polymer particles in a hygroscopic solution; and a protective layer covering said pair of substrates and said seal part.

18. The liquid crystal display device according to claim 17, wherein said seal part further comprises:

an inner seal part;

an outer seal part, wherein said hygroscopic solution is disposed between said inner seal part and said outer seal part.

* * * * *